US010493738B2

(12) United States Patent
Hulke et al.

(10) Patent No.: US 10,493,738 B2
(45) Date of Patent: Dec. 3, 2019

(54) ACRYLIC POLYVINYL ACETAL GRAPHIC FILMS

(71) Applicant: 3M INNOVATIVE PROPERTIES COMPANY, St. Paul, MN (US)

(72) Inventors: Amanda K. Hulke, St. Louis Park, MN (US); Keith R. Lyon, Hudson, WI (US); Jonathan E. Janoski, Woodbury, MN (US); Carla S. Thomas, Woodbury, MN (US); Anthony F. Schultz, Forest Lake, MN (US); Tien Y. H. Whiting, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/778,266

(22) PCT Filed: Dec. 13, 2016

(86) PCT No.: PCT/US2016/066348
§ 371 (c)(1),
(2) Date: May 23, 2018

(87) PCT Pub. No.: WO2017/112458
PCT Pub. Date: Jun. 29, 2017

(65) Prior Publication Data
US 2018/0339500 A1    Nov. 29, 2018

Related U.S. Application Data

(60) Provisional application No. 62/346,792, filed on Jun. 7, 2016, provisional application No. 62/270,750, filed on Dec. 22, 2015.

(51) Int. Cl.
*B32B 27/30* (2006.01)
*B32B 27/20* (2006.01)
*B32B 7/12* (2006.01)
*B32B 27/08* (2006.01)
*B32B 5/02* (2006.01)
*B32B 5/18* (2006.01)
(Continued)

(52) U.S. Cl.
CPC ............ *B32B 27/306* (2013.01); *B32B 5/022* (2013.01); *B32B 5/024* (2013.01); *B32B 5/18* (2013.01); *B32B 7/12* (2013.01); *B32B 7/14* (2013.01); *B32B 15/082* (2013.01); *B32B 23/08* (2013.01); *B32B 23/20* (2013.01); *B32B 27/06* (2013.01); *B32B 27/065* (2013.01); *B32B 27/08* (2013.01); *B32B 27/10* (2013.01); *B32B 27/12* (2013.01); *B32B 27/16* (2013.01); *B32B 27/18* (2013.01); *B32B 27/20* (2013.01); *B32B 27/281* (2013.01); *B32B 27/285* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 29/002* (2013.01); *B32B 2250/02* (2013.01); *B32B 2255/02* (2013.01); *B32B 2255/06* (2013.01); *B32B 2255/10* (2013.01); *B32B 2255/20* (2013.01); *B32B 2255/205* (2013.01); *B32B 2262/0253* (2013.01); *B32B 2262/0261* (2013.01); *B32B 2262/04* (2013.01); *B32B 2262/062* (2013.01); *B32B 2262/101* (2013.01); *B32B 2262/105* (2013.01); *B32B 2264/101* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2270/00* (2013.01); *B32B 2307/4023* (2013.01); *B32B 2307/41* (2013.01); *B32B 2307/412* (2013.01); *B32B 2307/416* (2013.01); *B32B 2307/518* (2013.01); *B32B 2307/54* (2013.01); *B32B 2307/546* (2013.01);
(Continued)

(58) Field of Classification Search
CPC ...... C08J 5/18; C08J 2333/08; C08J 2429/14; B32B 27/304; B32B 27/08; B32B 27/308; B32B 27/306; B32B 27/00; B32B 27/30; B32B 2307/54; B32B 2307/31; B32B 2307/732; B32B 2307/546; B32B 2255/26; B32B 2255/10; B32B 2250/246
See application file for complete search history.

(56) References Cited

U.S. PATENT DOCUMENTS 2,736,721 A    2/1956  Dexter
RE24,906 E    12/1960  Ulrich
(Continued)

FOREIGN PATENT DOCUMENTS

CN    101817975    9/2010
CN    103342968    10/2013
(Continued)

OTHER PUBLICATIONS

Chen, W., et al.; Macromolecules, 2001, vol. 34, p. 4277-4284.*
(Continued)

*Primary Examiner* — Robert S Jones
(74) *Attorney, Agent, or Firm* — Carolyn A. Fischer

(57) ABSTRACT

A graphic film is described comprising a first film layer having a Tg ranging from 30° C. to 60° C. The first film layer comprises a (meth)acrylic polymer and polyvinyl acetal polymer. In typical embodiments, the graphic film further comprises a design, image, graphic, or text. Also described is a method of forming a graphic film comprising providing a film comprising a first film layer having a Tg ranging from 30° C. to 60° C. comprising a (meth)acrylic polymer and polyvinyl acetal polymer and providing a graphic proximate the film.

21 Claims, No Drawings

(51) Int. Cl.
*B32B 7/14* (2006.01)
*B32B 15/082* (2006.01)
*B32B 23/08* (2006.01)
*B32B 23/20* (2006.01)
*B32B 27/06* (2006.01)
*B32B 27/10* (2006.01)
*B32B 27/12* (2006.01)
*B32B 27/16* (2006.01)
*B32B 27/18* (2006.01)
*B32B 27/28* (2006.01)
*B32B 27/32* (2006.01)
*B32B 27/34* (2006.01)
*B32B 27/36* (2006.01)
*B32B 27/40* (2006.01)
*B32B 29/00* (2006.01)
*C09D 11/101* (2014.01)

(52) U.S. Cl.
CPC ..... *B32B 2307/732* (2013.01); *B32B 2307/75* (2013.01); *B32B 2405/00* (2013.01); *B32B 2419/00* (2013.01); *B32B 2451/00* (2013.01); *B32B 2590/00* (2013.01); *B32B 2605/00* (2013.01); *B32B 2605/08* (2013.01); *C09D 11/101* (2013.01)

(56) References Cited

U.S. PATENT DOCUMENTS

| | | |
|---|---|---|
| 3,250,808 A | 5/1966 | Moore |
| 3,277,091 A | 10/1966 | Schmelzer et al. |
| 3,591,531 A | 7/1971 | Schroeder |
| 3,661,588 A | 5/1972 | Chang |
| 3,691,140 A | 9/1972 | Silver |
| 3,929,934 A | 12/1975 | Moore |
| 4,000,356 A | 12/1976 | Weisgerber |
| 4,181,752 A | 1/1980 | Martens |
| 4,243,500 A | 1/1981 | Glennon |
| 4,330,590 A | 5/1982 | Vesley |
| 4,418,120 A | 11/1983 | Kealy |
| 4,737,577 A | 4/1988 | Brown |
| 4,833,179 A | 5/1989 | Young |
| 4,894,259 A | 1/1990 | Kuller |
| 4,968,562 A | 11/1990 | Delgado |
| 4,994,322 A | 2/1991 | Delgado |
| 5,102,731 A | 4/1992 | Takimoto |
| 5,141,790 A | 8/1992 | Calhoun |
| 5,209,971 A | 5/1993 | Babu |
| 5,214,100 A | 5/1993 | Abele |
| 5,296,277 A | 3/1994 | Wilson |
| 5,362,516 A | 11/1994 | Wilson |
| 5,461,134 A | 10/1995 | Leir |
| 5,506,279 A | 4/1996 | Babu |
| 5,623,010 A | 4/1997 | Groves |
| 5,677,376 A | 10/1997 | Groves |
| 5,820,957 A | 10/1998 | Schroeder |
| 5,902,836 A | 5/1999 | Bennett |
| 6,113,679 A | 9/2000 | Adkins |
| 6,200,666 B1 | 3/2001 | Christian |
| 6,232,359 B1 | 5/2001 | Christian |
| 6,319,985 B1 | 11/2001 | Bruning |
| 6,423,381 B1 | 7/2002 | Colton |
| 6,498,202 B1 | 12/2002 | Sun |
| 6,576,396 B1 | 6/2003 | Leichsenring |
| 6,660,388 B2 | 12/2003 | Liu |
| 6,664,020 B1 | 12/2003 | Warner |
| 6,778,240 B2 | 8/2004 | Nakamura et al. |
| 6,806,320 B2 | 10/2004 | Everaerts |
| 6,846,075 B2 | 1/2005 | Ylitalo |
| 6,881,458 B2 | 4/2005 | Ludwig |
| 7,025,453 B2 | 4/2006 | Ylitalo |
| 7,072,333 B2 | 7/2006 | Ahn |
| 7,101,618 B2 | 9/2006 | Coggio |
| 7,173,778 B2 | 2/2007 | Jing |
| 7,385,020 B2 | 6/2008 | Anderson |
| 7,473,462 B2 | 1/2009 | Coggio |
| 7,718,264 B2 | 5/2010 | Klun |
| 8,372,517 B2 | 2/2013 | Tokuchi |
| 8,455,099 B2 | 6/2013 | Chevalier |
| 8,568,849 B2 | 10/2013 | Shi |
| 8,628,855 B2 | 1/2014 | Hao |
| 8,634,146 B2 | 1/2014 | David |
| 9,175,181 B2 | 11/2015 | Butler |
| 9,447,218 B2 | 9/2016 | Mikayama |
| 2003/0111519 A1 | 6/2003 | Kinney |
| 2003/0224150 A1 | 12/2003 | Ludwig |
| 2004/0077775 A1 | 4/2004 | Audenaert |
| 2004/0253534 A1 | 12/2004 | Kidnie |
| 2005/0003222 A1 | 1/2005 | Everaerts |
| 2005/0181943 A1 | 8/2005 | Kidnie |
| 2007/0032587 A1 | 2/2007 | Nakashima |
| 2008/0000583 A1 | 1/2008 | Steelman |
| 2009/0017313 A1 | 1/2009 | Outlaw |
| 2009/0053448 A1 | 2/2009 | Paiva |
| 2010/0015400 A1 | 1/2010 | Tokuchi |
| 2010/0055418 A1 | 3/2010 | Takamatsu |
| 2010/0058656 A1 | 3/2010 | Chevalier |
| 2011/0034618 A1 | 2/2011 | Register |
| 2011/0076613 A1 | 3/2011 | Yoshida |
| 2011/0112247 A1 | 5/2011 | Tokuchi |
| 2011/0282000 A1 | 11/2011 | Hayes |
| 2012/0003468 A1 | 1/2012 | Husemann |
| 2012/0231269 A1 | 9/2012 | Nakagawa |
| 2012/0260975 A1 | 10/2012 | Gerard |
| 2012/0288692 A1 | 11/2012 | Broyles |
| 2013/0004766 A1 | 1/2013 | Abe |
| 2013/0310509 A1 | 11/2013 | Hannemann |
| 2014/0030538 A1 | 1/2014 | Boutillier |
| 2014/0154505 A1 | 6/2014 | Steelman |
| 2015/0240067 A1 | 8/2015 | Nagai |
| 2016/0053039 A1 | 2/2016 | Mikayama et al. |
| 2016/0289440 A1 | 10/2016 | Janoski |

FOREIGN PATENT DOCUMENTS

| | | |
|---|---|---|
| CN | 103589320 | 2/2014 |
| DE | 102005023405 | 1/2007 |
| EP | 0411839 | 2/1991 |
| EP | 0447115 | 9/1991 |
| EP | 0570254 | 11/1993 |
| EP | 0570515 | 11/1993 |
| EP | 0617708 | 10/1994 |
| EP | 0659844 | 6/1995 |
| EP | 0710545 | 5/1996 |
| EP | 0783550 | 7/1997 |
| EP | 0997750 | 5/2000 |
| EP | 1038665 | 9/2000 |
| EP | 2080786 | 7/2009 |
| EP | 2163571 | 3/2010 |
| EP | 2284221 | 2/2011 |
| EP | 2623525 | 8/2013 |
| EP | 2937733 | 10/2015 |
| JP | S64-1737 | 1/1989 |
| JP | 09-324165 | 12/1997 |
| JP | H10-168271 | 6/1998 |
| JP | 10-292013 | 11/1998 |
| JP | 2000-247014 | 9/2000 |
| JP | 2003-040653 | 2/2003 |
| JP | 2004-331413 | 11/2004 |
| JP | 2005-015654 | 1/2005 |
| JP | 2005-054065 | 3/2005 |
| JP | 2007-023145 | 2/2007 |
| JP | 2007-277050 | 10/2007 |
| JP | 2008-055690 | 3/2008 |
| JP | 2008-106254 | 5/2008 |
| JP | 2009-102467 | 5/2009 |
| JP | 2010-083909 | 4/2010 |
| JP | 5255390 | 4/2010 |
| JP | 2011-012127 | 1/2011 |
| JP | 2014-005192 | 1/2014 |
| JP | 5610604 | 10/2014 |
| JP | 2014-224234 | 12/2014 |
| KR | 0148852 | 10/1998 |

(56) References Cited

FOREIGN PATENT DOCUMENTS

| | | |
|---|---|---|
| KR | 101289947 | 7/2013 |
| WO | WO 1992-13924 | 8/1992 |
| WO | WO 1995-13331 | 5/1995 |
| WO | WO 1996-01687 | 1/1996 |
| WO | WO 1998-15601 | 4/1998 |
| WO | WO 1998-29516 | 7/1998 |
| WO | WO 1999-03907 | 1/1999 |
| WO | WO 2000-12574 | 3/2000 |
| WO | WO 2003-012459 | 2/2003 |
| WO | WO 2004-044019 | 5/2004 |
| WO | WO 2005-023913 | 3/2005 |
| WO | WO 2005-058594 | 6/2005 |
| WO | WO 2006-094177 | 9/2006 |
| WO | WO 2006-102383 | 9/2006 |
| WO | WO 2009-029438 | 3/2009 |
| WO | WO 2009-041017 | 4/2009 |
| WO | WO 2009-146227 | 12/2009 |
| WO | WO 2010-078071 | 7/2010 |
| WO | WO 2010-078346 | 7/2010 |
| WO | WO 2010-141345 | 12/2010 |
| WO | WO 2011-042665 | 4/2011 |
| WO | WO 2011-088096 | 7/2011 |
| WO | WO 2011-094342 | 8/2011 |
| WO | WO 2011-094350 | 8/2011 |
| WO | WO 2012-069587 | 5/2012 |
| WO | WO 2012-136941 | 10/2012 |
| WO | WO 2012-148421 | 11/2012 |
| WO | WO 2013-019699 | 2/2013 |
| WO | WO 2013-019706 | 2/2013 |
| WO | WO 2013-019766 | 2/2013 |
| WO | WO 2013-019772 | 2/2013 |
| WO | WO 2014-050746 | 4/2014 |
| WO | WO 2014-123766 | 8/2014 |
| WO | WO 2014-156214 | 10/2014 |
| WO | WO 2014-172185 | 10/2014 |
| WO | WO 2014-179432 | 11/2014 |
| WO | WO 2015-064219 | 5/2015 |
| WO | WO 2015-157350 | 10/2015 |
| WO | WO 2016-094112 | 6/2016 |
| WO | WO 2016-094277 | 6/2016 |
| WO | WO 2016-094280 | 6/2016 |
| WO | WO 2017-112453 | 6/2017 |
| WO | WO 2017-112458 | 6/2017 |
| WO | WO 2017-112468 | 6/2017 |
| WO | WO 2017-112537 | 6/2017 |
| WO | WO 2017-112564 | 6/2017 |
| WO | WO 2017-214007 | 12/2017 |

OTHER PUBLICATIONS

"Intro in Properties and Applications," Specialized in Specialties, KSE ® Mowital, pp. 1-84.
"Polyvinyl Butyral of Superior Quality," Kuraray Specialties Europe GmbH, ® Mowital, 2003, pp. 1-36.
3M™ Screen Printing Ink 1905 Black, Apr. 19, 2016, 1page.
3M™ Screen Printing UV Ink 9802 Opaque Black, Jan. 19, 2016, pp. 2-3.
Aran, "Tailoring the Swelling and Glass-Transition Temperature of Acrylonitrile/Hydroxyethyl Acrylate Copolymers," Journal of Applied Polymer Science, Journal of Applied Polymer Science, 2010, vol. 116, pp. 628-635.
Butvar®, Polyvinyl Butyral Resin Properties and Uses, © Solutia Inc., 2006, pp. 1-32.
Eastman, Product Data Sheet, "Tenite™ Propionate 307E4000018 Clear, Trsp", 2000 [retrieved from the internet on May 25, 2017], URL <http://ws.eastman.com/ProductCatalogApps/PageControllers/ProdDatasheet_PC.aspx?Pro>, pp. 1-2.
FG00099—Vutek ® GSLXR 3M Superflex Ink, Mar. 17, 2015, 3pgs.
HP Safety Data Sheet, C4940 Series, 9380 Version No. 02, May 14, 2015, 1pg.
Kuraray, ® Mowital ® Pioloform, Technical Data Sheet, pp. 1-2.
Pocius, Adhesion and Adhesive Technology 3rd Ed., 287-291, (2012).
Roland Data Sheet, ECO-SOL MAX2, ESL4-CY, ECO-SOL MAX2, ESL4-4CY, v. G_5.0, Dec. 21, 2015.
Sideridou-Karayannidou, "Synthesis and Characterization of Copolymers of N-Vinylcarbazole and N, N-Dimethylaminoethyl Acrylate," Polymer, 1999, vol. 40, No. 17, pp. 4915-4922.
Standard Test Method for Tensile Properties of Thin Plastic Sheeting_ 10 Pages.
Wakabayashi, "Studies on s—Triazines. I. Contrimerization of Trichloroacetonitrile with Other Nitriles," Bulletin of the Chemical Society of Japan, 1969, vol. 42, pp. 2924-2930.
International Search Report for PCT International Application No. PCT/US2016/066348, dated Mar. 31, 2017, 7pgs.
International Search Report for PCT International Application No. PCT/US2015/064219, dated Mar. 18, 2016, 4pgs.
International Search Report for PCT International Application No. PCT/US2015/064215, dated Mar. 18, 2016, 5pgs.
Chen, W., et al., Macromolecules, 2001, vol. 34, pp. 4277-4284.
Carbodeon, "Carbodeon company presentation on nanodiamond additives to fluoropolymer coatings and composites", 20 pages.
KSE, "Introduction in properties and applications", Mowital, pp. 01-84.
"Nanodiamond dispersion for solvent based fluoropolymer coatings", Datasheet, 2016, Diamond Additive, 1 page.
International Search Report for PCT International Application No. PCT/US2015/063073, dated Feb. 26, 2016, 4 pages.
International Search Report for PCT International Application No. PCT/US2016/066309, dated Sep. 26, 2017, 8 pages.
International Search Report for PCT International Application No. PCT/US2016/066453, dated Sep. 1, 2017, 5 pgs.

\* cited by examiner

ACRYLIC POLYVINYL ACETAL GRAPHIC FILMS

CROSS REFERENCE TO RELATED APPLICATIONS

This application is a national stage filing under 35 U.S.C. 371 of PCT/US2016/066348, filed Dec. 13, 2016, which claims the benefit of U.S. Provisional Application No. 62/270,750, filed Dec. 22, 2015, and U.S. Provisional Application No. 62/346,792, filed Jun. 7, 2016, the disclosure of which is incorporated by reference in its/their entirety herein.

SUMMARY

In one embodiment, a graphic film is described comprising a first film layer having a Tg ranging from 30° C. to 60° C. The first film layer comprises a (meth)acrylic polymer and polyvinyl acetal polymer comprising polymerized units having the following formula

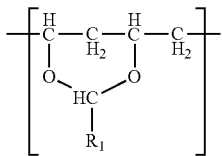

wherein $R_1$ is hydrogen or a C1-C7 alkyl group. In typical embodiments, the graphic film further comprises a design, image, graphic, or text.

Also described is a method of forming a graphic film comprising providing a film comprising a first film layer having a Tg ranging from 30° C. to 60° C. comprising a (meth)acrylic polymer and polyvinyl acetal polymer and providing a graphic proximate the film.

DETAILED DESCRIPTION

Presently described are films comprising more than one layer. The film comprises at least one layer, i.e. a first film layer comprising a (meth)acrylic polymer and polyvinyl acetal polymer.

The first film layer comprises polymerized units of one or more (meth)acrylate ester monomers derived from a (e.g. non-tertiary) alcohol containing 1 to 14 carbon atoms and preferably an average of 4 to 12 carbon atoms Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The first film layer comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the first film layer comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate. In some embodiments, the monomer is an ester of (meth)acrylic acid with an alcohol derived from a renewable source, such as 2-octyl (meth)acrylate.

The first film layer typically comprises at least 10, 15, 20 or 25 wt.-% of polymerized units of monofunctional alkyl (meth)acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) polymer, and crosslinker when present. The first film layer typically comprises no greater than 60, 55, 50, 45, or 40 wt.-% of polymerized units of monofunctional alkyl (meth)acrylate monomer having a Tg of less than 0° C., based on the total weight of the polymerized units.

In other embodiments, the first film layer comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

When the first film layer is free of unpolymerized components such as inorganic filler and additives, the wt.-% of specified polymerized units is approximately the same as the wt.-% of such polymerized units present in the total first film layer composition. However, when the first film layer composition comprises unpolymerized components, such as inorganic filler or other unpolymerizable additive the total first film layer composition can comprise substantially less polymerized units. In general, the total amount of unpolymerizable additives may range up to 25 wt.-%. Thus, in the case of first film layers comprising such unpolymerizable additives the concentration of specified polymerized units can be as much as 5, 10, 15, 20, 25 wt.-% less, depending on the total concentration of such additives. For example, when the first film layer comprises 20 wt.-% inorganic filler, the concentration of low Tg monofunctional alkyl (meth) acrylate monomer may be 20% less, i.e. at least 8 wt.-%, 12 wt.-% etc.

The first film layer generally comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In typical embodiments, the first film layer comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the first film layer comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the first film layer comprises no greater than 30, 25, 20, or 10 wt.-% of polymerized units of high Tg monofunctional alkyl (meth)acrylate monomer. Further, in some embodiments, the first film layer comprises less than 1.0, 0.5, 0.1 wt.-% or is free of polymerized units of high Tg monofunctional alkyl (meth)acrylate monomer.

In other embodiments, the first film layer, comprises greater than 40 wt.-% of polymerized units of a monofunctional alkyl (meth)acrylate monomer having a Tg greater than 40° C. based on the total weight of the polymerized units of the (meth)acrylic polymer, polyvinyl acetal (e.g. butyral) polymer, and crosslinker when present. For example, the maximum concentration of polymerized units of a monofunctional alkyl (meth)acrylate monomer having a Tg greater than 40° C. may be 50, 60, 70, 80, or 90 wt.-%.

The Tg of the homopolymer of various monomers is known and is reported in various handbooks. The Tg of some illustrative monomers is also reported in PCT Application No. PCT/US2015/64215, filed Dec. 7, 2015; incorporated herein by reference In typical embodiments, the first film layer further comprises at least 10, 15 or 20 wt.-% and no greater than 65 wt.-% of polymerized units of polar monomers. Such polar monomers generally aids in compatibilizing the polyvinyl acetal (e.g. butyral) polymer with the high and low Tg alkyl (meth)acrylate solvent monomers. The polar monomers typically have a Tg greater than 0° C., yet the Tg may be less than the high Tg monofunctional alkyl (meth)acrylate monomer.

Representative polar monomers include for example acid-functional monomers, hydroxyl functional monomers, nitrogen-containing monomers, and combinations thereof.

In some embodiments, the first film layer comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the first film layer comprises 0.5 up to 20 or 25 wt.-% of polymerized units of acid functional monomers, such as acrylic acid. In some embodiments, the first film layer composition comprises at least 1, 2, 3, 4, or 5 wt.-% of polymerized units of acid-functional monomers. In other embodiments, the first film layer composition comprises less than 1.0, 0.5, 0.1 wt.-% or is free of polymerized units of acid-functional monomers.

In some embodiments, the first film layer comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the first film layer comprises at least 0.5, 1, 2, 3, 4, or 5 wt.-% of polymerized units of nitrogen-containing monomers and typically no greater than 25 or 30 wt.-%. In other embodiments, first film layer comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the first film layer comprises at least 0.5, 1, 2, 3, 4, or 5 wt.-% of polymerized units of alkoxy-functional (meth)acrylate monomers and typically no greater than 30 or 35 wt.-%. In other embodiments, the first film layer comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The first film layer generally comprises polymerized units of polar monomer in an amount of at least 10, 15 or 20 wt.-% and typically no greater than 65, 60, 55, 50 or 45 wt.-%.

The first film layer may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the first film layer comprises at least 0.5, 1, 2, 3, 4, or 5 wt.-% and typically no greater than 10 wt.-% of polymerized units of vinyl monomers. In other embodiments, the first film layer comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the (e.g. solvent) monomer(s) are polymerized to form a random (meth)acrylic polymer copolymer.

The polyvinyl acetal polymer utilized in the present invention is obtained, for example, by reacting polyvinyl alcohol with aldehyde, as known in the art and described in greater detail in previously cited PCT Application No.

PCT/US2015/64215, filed Dec. 7, 2015. The polyvinyl acetal polymer is typically a random copolymer. However, block copolymer and tapered block copolymer may provide similar benefits as random copolymers.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer. In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%.

In some embodiments, the alkyl residue of aldehyde comprises 1 to 7 carbon atoms. In other embodiments, the alkyl reside of the aldehyde comprises 3 to 7 carbon atoms such as in the case of butylaldehyde ($R_1=3$), hexylaldehyde ($R_1=5$), n-octylaldehyde ($R_1=7$). Of these butylaldehyde, also known as butanal is most commonly utilized. Polyvinyl butyral ("PVB") polymer is commercially available from Kuraray under the trade designation "Mowital™" and Solutia under the trade designation "Butvar™".

In some embodiments, the polyvinyl acetal (e.g. butyral) polymer has a Tg ranging from about 60° C. up to about 75° C. or 80° C. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in the first film layer composition in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the first film layer composition in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the first film layer comprises 5 to 30 wt.-% of polyvinyl acetal polymer such as polyvinyl butyral based on the total weight of the polymerized units of the (meth)acrylate polymer, polyvinyl acetal (e.g. butyral) polymer, and crosslinker when present. In some embodiments, the first film layer comprises at least 10, 11, 12, 13, 14, or 15 wt.-% of polyvinyl acetal (e.g. PVB) polymer. In some embodiments, the first film layer comprises no greater than 25 or 20 wt.-% of polyvinyl acetal (e.g. PVB) polymer. When the first film layer comprises a polyvinyl acetal (e.g. PVB) polymer having an average molecular weight (Mw) less than 50,000 g/mole, the first film layer may comprise higher concentration polyvinyl acetal (e.g. PVB) polymer such as 35 or 40 wt.-%. Thus, the film and composition comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

In other embodiments, the first film layer comprises less than 5 wt.-% of polyvinyl acetal (e.g. butyral) polymer based on the total weight of the polymerized units of the (meth)acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 1.5, 3, 3.5, 4, or 4.5 wt.-%

In some embodiments, the first film layer comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. $C_3$-$C_{20}$ olefin groups); as well as chlorinated triazine crosslinking compounds.

Examples of useful (e.g. aliphatic) multifunctional (meth) acrylate include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula

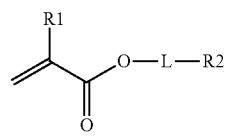

R1 is H or $CH_3$,

L is an optional linking group; and

R2 is an olefin group, the olefin group being optionally substituted.

Dihydrocyclopentadienyl acrylate is one example of this class of crosslinking monomer. Other crosslinking monomers of this type comprising a $C_6$-$C_{20}$ olefin are described in WO2014/172185.

In other embodiments, the crosslinking monomer comprises at least two terminal groups selected from allyl, methallyl, or combinations thereof. An allyl group has the structural formula $H_2C=CH-CH_2-$. It consists of a methylene bridge ($-CH_2-$) attached to a vinyl group ($-CH=CH_2$). Similarly, a methallyl group is a substituent with the structural formula $H_2C=C(CH_3)-CH_2-$. The terminology (meth)allyl includes both allyl and methallyl groups. Crosslinking monomers of this types are described in PCT Publication WO2015/157350.

In some embodiments, the first film layer may comprise a multifunctional crosslinker comprising vinyl groups, such as in the case of 1,3-divinyl tetramethyl disiloxane.

The triazine crosslinking compound may have the formula.

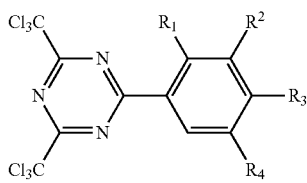

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5 or 10 wt.-% based on the total weight of the polymerized units of the (meth)acrylate polymer, polyvinyl acetal (e.g. butyral) polymer, and crosslinker. Thus, the first film layer comprises such amount of polymerized crosslinker units. In some embodiments, multifunctional (meth)acrylate crosslinkers are present in an amount less than 1 wt.-%.

In other embodiments, the first film layer comprises greater than 10 wt.-% of polymerized crosslinker units based on the total weight of the polymerized units of the (meth)acrylic polymer, polyvinyl acetal (e.g. butyral) polymer, and crosslinker when present. For example, the maximum concentration of polymerized crosslinker units may range up to 50, 55, 60, 65, 70, 75 or 80 wt.-%.

The first film layer can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the first film layer comprises zero or no greater than 10, 9, 8, 7, 6, 5, 4, 3, 2, or 1 wt.-% of polymerized units of monomer having a methacrylate group. One method of preparing the first film layer described herein comprises dissolving the polyvinyl acetal (e.g. PVB) polymer in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s).

The polyvinyl acetal (e.g. PVB) polymer can be added prior to and/or after partial polymerization of monomer(s) of the (meth)acrylic polymer. In this embodiment, the coatable composition comprises partially polymerized (e.g. alkyl (meth)acrylate) solvent monomers and polyvinyl acetal (e.g. PVB) polymer. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate such as a release liner, and polymerized by exposure to radiation.

The method can form a higher molecular weight (meth) acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the first film layer composition can be increased even further by the inclusion of crosslinker.

The high molecular weight (meth)acrylic polymer as well as the first film layer typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the first film layer composition can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; photoactive oximes such as 1-phenyl-1, 2-propanedione-2-(O-ethoxy-carbonyl)oxime; mono- or bis-acrylphosphine oxides such as IRGANOX 819 or LUCIRIN TPO.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt.-%. Relatively thick coatings can be achieved when the extinction coefficient of the photoinitiator is low.

The first film layer composition can be coated on an (e.g. unstructured) release liner using conventional coating techniques. For example, these film compositions can be applied by methods such as roller coating, flow coating, dip coating, spin coating, spray coating knife coating, and die coating.

Coating thicknesses may vary. The film composition may be of any desirable concentration for subsequent coating, but is typically 5 to 30, 35 or 40 wt.-% polyvinyl acetal polymer solids in (meth)acrylic solvent monomer. The desired concentration may be achieved by further dilution of the coatable composition. The coating thickness may vary depending on the desired thickness of the (e.g. radiation) cured first film layer.

The coated release liner may be brought in contact with the second layer, prior to curing. Alternatively the first film layer may be cured prior to the second layer being disposed proximate the first layer.

The first film layer composition and the photoinitiator may be irradiated with activating UV radiation having a UVA maximum in the range of 280 to 425 nanometers to polymerize the monomer component(s). UV light sources can be of various types. Low light intensity sources, such as blacklights, generally provide intensities ranging from 0.1 or 0.5 mW/cm$^2$ (millwatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, the first film layer is transparent having a transmission of visible light of at least 90 percent. In some embodiments, the first film layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in concurrently filed U.S. patent application Ser. No. 15/175,458. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

When the first film layer is transparent, it can be utilized as any layer within the film, such as a backing, cover film, or intermediate layer (i.e. a layer between the outermost layers). In other embodiments, the first film layer is opaque (e.g. white) or reflective and typically utilized as a backing or intermediate layer.

The film (e.g. first or second film layer) may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total first film layer composition. In other embodiments, the concentration of additive can range up to 40, 45, 50, 55 or about 65 wt.-% of the total first film layer composition.

In some embodiments, the first film layer is free of plasticizer, tackifier and combinations thereof. In other embodiments, the first film layer composition comprise plasticizer, tackifier and combinations thereof in amount no greater than 5, 4, 3, 2, or 1 wt.-% of the total first film layer composition. From the standpoint of tensile strength, it is preferable not to add a large amount of tackifier or plasticizer.

In some embodiments, the first film layer composition comprises fumed silica. The concentration of (e.g. fumed) silica can vary. In some embodiments, the first film layer comprises at least 0.5 or 1.0 wt.-% of (e.g. fumed) silica.

The first film layer can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the first film layer refers to the midpoint Tg as measured by Differential Scanning calorimetry, (DSC), according to the test method described in previously cited PCT Application No. PCT/US2015/64215, filed Dec. 7, 2015. When the film and (e.g. radiation) cured composition comprises a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the first film layer and is generally at least 20, 25, or 30° C. ranging up to 55, 56, 57, 58, 59, or 60° C. In some embodiments, the Tg of the first film layer is at least 31, 32, 33, 34, or 35° C. In other embodiments, the Tg of the first film layer is at least 36, 37, 38, 39, or 40° C. In yet other embodiments, the Tg of the first film layer is at least 41, 42, 43, 44, or 45° C. In some embodiments, the first film layer or composition thereof exhibits a single Tg as measured by DSC. Thus, the (meth)acrylic polymer and polyvinyl acetal polymer composition can exhibit a single Tg. Thus, the polymerized (meth)acrylic polymer and polyvinyl acetal polymer composition alone or in combination with crosslinker can exhibit a single Tg.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single (e.g. continuous) phase. Alternatively, the film or (e.g. radiation) cured composition can be tested by transmission electron microscopy according to the test method described in concurrently filed U.S. patent application Ser. No. 15/175,458. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns. An average dispersion size of less than 0.1 microns can also provide films having a low haze and high transmission.

The first film layer can be characterized by tensile and elongation according to the test method described in previously cited PCT Application No. PCT/US2015/64215, filed Dec. 7, 2015. In some embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or 300% and greater. In some embodiments, the elongation is at least 50, 100, 150, or 175% and may range up to 225, 250, 275, or 300%.

The first film layer is preferably non-tacky to the touch at room temperature (25° C.) and preferably at (e.g. storage or shipping) temperatures ranging up to (120° F.) 50° C. In some embodiments, the first film layer may exhibit a low level of adhesion to glass. For example, the 180° peel values can be about 2 oz/inch or less at a 12 inch/minute peel rate.

The film further comprises a second layer proximate the first film layer. The second layer may be in contact with the first film layer or a primer or adhesion-promoting treatment may be disposed between the (e.g. base) first film layer and the second layer (e.g. backing, topcoat, cover film). In yet another embodiment, an adhesive may be disposed between the first film layer and second layer. In some typical embodiments, the second layer is continuous and unstructured. In another embodiment, the second layer is a continuous or discontinuous graphic. The film can comprise more than one second layer.

Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. The first film layer and/or backing may also be subjected to an adhesion-promoting treatment such as air or nitrogen corona treatment, plasma, flame, or actinic radiation.

The second layer is different than the first film layer. When the second layer is transparent, it can be utilized as any layer within the graphic article, such as a backing or cover film. When the second film layer is opaque (e.g. white) or reflective, it is typically utilized as a backing or intermediate layer.

In some embodiments, the second layer is a pre-formed (e.g. extruded) film. In other embodiments, the second layer is formed from drying and optionally curing a solvent-based coating or water-based coating composition.

In some embodiments, the second layer also comprises a (meth)acrylic polymer and a polyvinyl acetal polymer composition. In this embodiment, the Tg of the second layer is not less than 30° C. Rather the Tg is at least 30° C. or 35° C. or greater.

When the first film layer and second (e.g. film) layer both comprise (meth)acrylic polymer and polyvinyl acetal polymer composition, the compositions are not the same. For example, the compositions may have a different color, different opacity, or different concentration of polymerized units of a specified monomer.

In some embodiments, the second layer comprises a cured (e.g. (meth)acrylic composition typically having a Tg of at least 30° C. In some embodiments, the second (e.g. film) layer has a higher glass transition temperature, Tg, than the first film layer. In some embodiments, the Tg of the second (e.g. film) layer is greater than 40, 45, 50, 55, or 60° C. In some embodiments, the second layer may be characterized as a hardcoat.

In some embodiments, the second layer comprises a (e.g. free-radically) polymerizable composition that comprises a (meth)acrylic polymer without a polyvinyl acetal polymer.

The (meth)acrylic polymer composition of the second layer may comprise at least 50 wt.-%, 60 wt.-%, 70 wt.-%, 80 wt.-%, or 90 wt.-% of polymerized units of one or more multifunctional free-radically polymerizable monomer(s) and/or oligomer(s) that can be photocured once the (e.g. hardcoat) composition has been coated. Useful multi-(meth) acrylate monomers and oligomers include:

(a) di(meth)acrylate such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acrylates such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acrylates such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acrylates such as, for example, urethane acrylates, polyester acrylates, and epoxy acrylates can also be employed.

In some embodiments, the polymerizable composition of the second layer includes both poly(meth)acrylate and polyurethane material, which can be termed a "urethane acrylate."

Various (meth)acrylate monomers and oligomers are available from vendors such as, for example, Sartomer Company of Exton, Pa.; UCB Chemicals Corporation of Smyrna, Ga.; and Aldrich Chemical Company of Milwaukee, Wis.

In some embodiments, the second layer comprises polymerized units of at least one monomer, oligomer, or polymer comprising a silicone group or fluorinated group. In inclusion of such generally lowers the surface energy of the coating composition and thus may be characterized as a low surface energy group.

The amount of material comprising the silicone or fluorinated group is generally relatively low and thus such material can be characterized as low surface energy additives.

The second layer typically comprises at least 0.05 and preferably at least 0.10 wt-% solids of one or more low surface energy additive(s). The total amount of low surface energy additive(s) can range up to 10 wt-% solids.

In some embodiments, the amount of low surface energy additive(s) ranges up to 1 wt-%, 2 wt-%, 3 wt-%, 4 wt-%, or 5 wt-% solids.

Various fluorinated low surface energy groups are known including perfluoroalkyl groups and perfluoropolyether groups.

A fluorinated group, and especially a perfluoropolyether group, can be favored for concurrently providing ink repellency.

The cured surface layer and coated articles exhibit "ink repellency" when ink from a pen, commercially available under the trade designation "Sharpie", beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

A surface comprising the cured coating described herein preferably exhibits a high advancing contact angle with water of at least 70 degrees. More preferably, the advancing contact angle with water is at least 80 degrees and more preferably at least 90 degrees. Cured coating compositions comprising fluorinated additives and silicone additives (e.g. TEGO® Rad 2100) typically exhibit high advancing contact angles with water.

The surface comprising the cured coating described herein preferably exhibits a receding contact angle with hexadecane of at least 40, 45 or 50 degrees and typically no greater than 60 degrees.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be $(C_pF_{2p+1})$—, $(C_pF_{2p+1}O)$—, $(X'C_pF_{2p})$—, or $(X'C_pF_{2p+1})$— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_nCF_2$—, $C_3F_7O(CF_2CF_2CF_2O)_nCF_2CF_2$—, and $C_3F_7O(CF(CF_3)CF_2O)_nCF(CF_3)$— wherein n has an average value of 0 to 50, 1 to 50, 3 to 30, 3 to 15, or 3 to 10.

Suitable structures for divalent $R_f$ groups include, but are not limited to, —$CF_2O(CF_2O)_q(C_2F_4O)_nCF_2$—, —$(CF_2)_3O(C_4F_8O)_n(CF_2)_3$—, —$CF_2O(C_2F_4O)_nCF_2$—, —$CF_2CF_2O(CF_2CF_2CF_2O)_nCF_2CF_2$—, and —$CF(CF_3)(OCF_2CF(CF_3))_sOCF_2O(CF(CF_3)CF_2O)_nCF(CF_3)$—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

For embodiments wherein Rf is divalent and two (e.g. terminal) reactive groups are bonded to Rf (such as in the case of a diol), the concentration of such divalent monomer is sufficiently low as to avoid excessive crosslinking that can result in formation of a gel.

In some embodiments, the second (e.g. film) layer comprises a perfluoropolyether urethane additive.

The perfluoropolyether urethane material is preferably prepared from an isocyanate reactive HFPO-material. Unless otherwise noted, "HFPO-" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, "a" averages between 3 and 10 or a averages between 5 and 8. Such species generally exist as a distribution or mixture of oligomers with a range of values for "a", so that the average value of a may be non-integer. For example, in one embodiment, "a" averages 6.2. The molecular weight of the HFPO-perfluoropolyether material varies depending on the number ("a") of repeat units from about 940 g/mole to about 1600 g/mole, with 1100 g/mole to 1400 g/mole typically being preferred.

In one embodiment, the reaction product comprises a perfluoropolyether urethane additive of the formula:

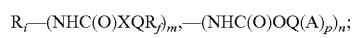

$$R_i\text{—}(NHC(O)XQR_f)_m\text{—}(NHC(O)OQ(A)_p)_n;$$

wherein
$R_i$ is the residue of a multi-isocyanate;
X is O, S or NR, wherein R is H or an alkyl group having 1 to 4 carbon;
$R_f$ is a monovalent perfluoropolyether moiety comprising groups of the formula $F(R_{fc}O)_xC_dF_{2d}$—, wherein each $R_{fc}$ is independently a fluorinated alkylene group having from 1 to 6 carbon atoms, each x is an integer greater than or equal to 2, and wherein d is an integer from 1 to 6;
each Q is independently a connecting group having a valency of at least 2;
A is a (meth)acryl functional group —$XC(O)C(R_2)$=$CH_2$ wherein $R_2$ is an alkyl group of 1 to 4 carbon atoms or H or F;
m is at least 1; n is at least 1; p is 2 to 6; m+n is 2 to 10; wherein each group having subscripts m and n is attached to the $R_i$ unit.

Q in association with the Rf group is a straight chain, branched chain, or cycle-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

When X is O, Q is typically not methylene and thus contains two or more carbon atoms. In some embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q contains a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroatom-containing functional group such as carbonyl and sulfonyl. In some embodiments Q contains a nitrogen containing group such an amide group such as —C(O)NHCH$_2$CH$_2$—, —C(O)NH(CH$_2$)$_6$—, and —C(O)NH(CH$_2$CH$_2$O)$_2$CH$_2$CH$_2$—.

Various perfluoropolyether urethane additives can be utilized as described in PCT Publication WO2006/102383; incorporated herein by reference.

Alternatively or in combination with a low surface energy additive comprising a fluorinated group, the hardcoat may comprise a low surface energy additive comprising a silicone group.

In one embodiment, the low surface energy additive comprises a polydimethylsiloxane (PDMS) backbone and at least one (meth)acrylate group.

In one embodiment, the low surface energy additive comprises at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

Based on NMR analysis "TEGO Rad 2100" and "TEGO Rad 2500" are believed to have the following chemical structure:

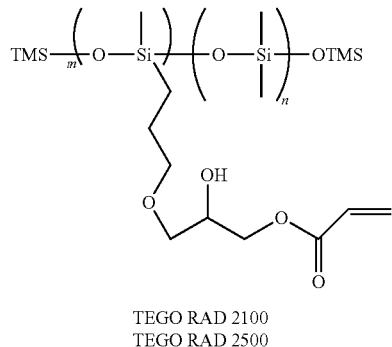

TEGO RAD 2100
TEGO RAD 2500 wherein n ranges from 10 to 20 and m ranges from 0.5 to 5.

In some embodiments, n ranges from 14 to 16 and m ranges from 0.9 to 3. The molecular weight typically ranges from about 1000 g/mole to 2500 g/mole.

Based on Thermal Gravimetric Analysis (according to the test method described in the example), silicone (meth) acrylates having a residue content of less than 12 wt-% provided the lowest haze values according to the Cellulose Surface Attraction Test.

Compositions comprising a low surface energy additive comprising a silicone group have been found to provide low lint attraction. In some embodiments, the surface layers (e.g. comprising such silicone (meth)acrylate additives) prefer-ably have a haze of less than 20%, more preferably less than 10% and even more preferably less than 5% according to the Cellulose Surface Attraction Test described in WO 2009/029438; incorporated herein by reference.

In some embodiments, the second layer (e.g. backing, topcoat, or cover film) comprises or consists of a fluoropolymer. Fluoropolymers are general derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluorovinyl ethers (including perfluoroallyl vinyl ethers and perfluoroalkoxy vinyl ethers), perfluoroallyl ethers (including perfluoroalkyl allyl ethers and perfluoroalkoxy allyl ethers), perfluoroalkyl vinyl monomers, and combinations thereof.

In some embodiments, the fluoropolymer is formed from the constituent monomers known as tetrafluoroethylene ("TFE"), hexafluoropropylene ("HFP"), and vinylidene fluoride ("VDF," "VF2,"). The monomer structures for these constituents are shown below:

The fluoropolymers preferably comprise at least two of the constituent monomers (HFP and VDF), and more preferably all three of the constituents monomers in varying molar amounts. Additional monomers not depicted in (1), (2) or (3) but also useful include perfluorovinyl ether monomers of the general structure CF$_2$=CF—OR$_f$, wherein R$_f$ can be a branched or linear perfluoroalkyl radicals of 1-8 carbons and can itself contain additional heteroatoms such as oxygen. Specific examples are perfluoromethyl vinyl ether, perfluoropropyl vinyl ethers, perfluoro(3-methoxypropyl) vinyl ether. Additional examples are found in Worm (WO 00/12574), assigned to 3M, and in Carlson (U.S. Pat. No. 5,214,100).

Various fluoroplastics and fluoroelastomers are known such as described in U.S. Pat. No. 3,929,934. In some embodiments, the elastomers have the general formula:

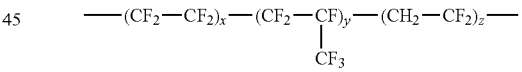

wherein x, y and z are expressed as molar percentages. In some embodiments, x, y, and z are chosen to comprise no greater than 40 or 35 wt.-% TFE, no greater than 25 wt. % HFP and no greater than 70, 65, or 60 wt.-% VDF. In other embodiments, the copolymer comprises no more than 80, 70 or 60 wt.-% VDF and no more than 60, 50, or 40 wt.-% HFP.

For improved durability, the fluoropolymer may be polymerized in the presence of a chain transfer agent and/or halogen-containing cure site monomers and/or halogenated endgroups to introduce cure sites into the fluoropolymer. These halogen groups can provide reactivity with the adhesion promoting group and facilitate the formation of the polymer network. Useful halogen-containing monomers are well known in the art and typical examples are found in WO2014/179432.

Optionally halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: Br—$CF_2CF_2$—Br, $CF_2Br_2$, $CF_2I_2$, $CH_2I_2$. Other typical examples are found in U.S. Pat. No. 4,000,356 to Weisgerber.

In another embodiment, the fluoropolymer can be rendered reactive by dehydrofluorinated by any method that will provide sufficient carbon-carbon unsaturation of the fluoropolymer to create increased bond strength between the fluoropolymer and a hydrocarbon substrate or layer. The dehydrofluorination process is a well-known process to induced unsaturation and it is used most commonly for the ionic crosslinking of fluoroelastomers by nucleophiles such as diphenols and diamines. This reaction is characteristic of VDF containing elastomers. Furthermore, such a reaction is also possible with primary and secondary aliphatic mono-functional amines and will produce a DHF-fluoropolymer with a pendent amine side group.

In some embodiments, the second (e.g. film or hardcoat) layer further comprises inorganic oxide nanoparticles. The inorganic oxide nanoparticles can comprise silica, or can comprise a combination of oxides, such as silica and aluminum oxide, or a core of an oxide of one type (or a core of a material other than a metal oxide) on which is deposited an oxide of another type. Various high refractive index inorganic oxide nanoparticles can be employed such as for example zirconia ("$ZrO_2$"), titania ("$TiO_2$"), antimony oxides, alumina, tin oxides, alone or in combination. Mixed metal oxide may also be employed.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the five-radically polymerizable (e.g. monomer and/or oligomer) organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular weight, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethoxyethyl carbamate, N-(3-triethoxysilylpropyl) methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

When the second layer is a coating composition, it can be applied to the surface of the film layer (and the graphic when present) dried to remove the solvent and then cured for example by exposure to (e.g. ultraviolet) radiation. Alternatively, a transferable film may be formed coating the composition to a release liner, at least partially cured, and subsequently transferring from the release layer to the substrate using a thermal transfer or photoradiation application technique.

The second layer coating composition can be applied as a single or multiple layers directly to an article or film substrate using conventional film application techniques. Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

In yet other embodiments, the second layer can be characterized as a backing. In yet another embodiment, the film may comprises a first film layer, as previously described, a second layer proximate the first film layer wherein the second (e.g. film) layer comprises a (meth)acrylic polymer, and the film further comprises a backing. The first film layer is typically disposed between the backing and second (e.g. film) layer. Further, a graphic is disposed between the first film layer and second (e.g. film) layer.

The backing can comprise a variety of flexible and inflexible (e.g. preformed web) substrates including but not limited to polymeric films, woven or nonwoven fabrics, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyimide, fluoropolymer, cellulose acetate, cellulose triacetate, ethyl cellulose, as well as bio-based material such as polylactic acid (PLA). The woven or nonwoven fabric may comprise fibers or filaments of synthetic or natural materials such as cellulose (e.g. tissue), cotton, nylon, polyethylene, rayon, glass, ceramic materials, and the like.

In some embodiments, the second layer (e.g. backing, topcoat, or cover film) is a (e.g. thermoplastic) polymer such as polycarbonate, polyethylene terephthalate, polyamide, polyethylene, polypropylene, polystyrene, polyvinyl chloride, poly(meth)acrylic polymer, ABS (acrylonitrile-butadiene-styrene copolymer), and the like.

In some embodiments, the second layer (e.g. backing, hardcoat, or cover film) is a transparent film having a transmission of visible light of at least 90 percent.

In other embodiments, the second layer (e.g. backing) is opaque (e.g. white) or reflective.

In another embodiment, the first film layer or second film layer (e.g. backing) may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The first film layer and second (e.g. film) layer may have the same thickness as the backing. However, the first and/or second (e.g. film) layer, particularly when utilized in combination with a backing, may be less than 10 microns. In some embodiments, the first and/or second film layer is typically at least 250 nm, 500 nm, 750 nm or 1 micron. The backing as well as the overall film is typically in the form of a roll-good, but may also be in the form of individual sheets.

In some embodiments, the graphic article, first film layer, cover film and/or backing is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable second film layer and/or backings include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the overall film, first film layer, cover film and/or backing has sufficient inelastic deformation after being stretched so that when stretched, the film does not recover to its original length. In some embodiments, the film, first film layer, and/or backing has an inelastic deformation of at least 5% after being stretched once to 115% of their original length. In other embodiments, the conformability of the film, first film layer, or backing as determined by % tensile set as described in PCT Application No. PCT/US2015/64215, filed Dec. 7, 2015, is at least 20, 25, or 30%.

In some embodiments, a layer of an adhesive composition is proximate the first film layer or second (e.g. backing) layer. The adhesive is typically disposed directly on the first film or second (e.g. backing) layer or may comprise a primer or adhesion promoting treatment between the first film or second (e.g.) backing layer and the adhesive layer. The type of primer will vary with the type of film and adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into a solvent at very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

In one embodiment, a sufficiently transparent layer of an adhesive composition may be disposed between the first film layer and a second (e.g. film) layer. The first film layer may be a backing, a cover film, or both the backing and the cover film. The graphic is typically positioned beneath the cover film or beneath the adhesive and cover film. Thus, the graphic is viewed through the cover film and optionally through the adhesive.

The adhesive layer may be any suitable adhesive, particularly when the adhesive is disposed on the opposing surface of the first film layer or backing. Non-limiting examples of adhesives include pressure sensitive adhesives, heat activated adhesives, radiation curable adhesives, and the like. Examples of formulation types include solvent-based solutions, water-based latex, microspheres, hot melt coatable, and suitable combinations thereof. The pressures sensitive adhesive (PSA) may be any type of PSA such as those described in the *Handbook of Pressure-Sensitive Adhesives*, Ed. D. Satas, 2 nd Edition, Von Nostrand Reinhold, New York, 1989. Classes of useful pressure sensitive adhesives include, for example, rubber resin materials such as tackified natural rubbers or those based on synthetic rubbers, styrene block copolymers, polyvinyl ethers, acrylics (including both acrylates and methacrylates), polyurethanes, poly-alpha-olefins, silicone resins, and the like. Combinations of these adhesives can be used. Additionally, further useful adhesives include those that may be activated at elevated temperature for application at use temperature. These generally meet the Dahlquist criterion at use temperature.

The pressure sensitive adhesive may be inherently tacky. If desirable, tackifiers may be added to a pressure sensitive adhesive base material to form the pressure sensitive adhesive. Useful tackifiers include, for example, rosin ester resins, aromatic hydrocarbon resins, aliphatic hydrocarbon resins, mixed aromatic/aliphatic hydrocarbon resins, and terpene resins. Other materials can be added for special purposes, including, for example, oils, plasticizers, antioxidants, ultraviolet ("UV") stabilizers, hydrogenated butyl rubber, pigments, fillers, curing agents, and crosslinkers. Some examples of fillers or pigments include zinc oxide, titanium dioxide, silica, carbon black, metal powders and calcium carbonate.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm$^2$). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,516 (both Wilson et al) and U.S. Pat. No. 5,141,790 (Calhoun et al) and WO 96/1687 (Keller et al.) Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester), and U.S. Pat. No. 5,461,134 (Leir et al). Acrylate-based PSA's include those described in U.S. Pat. No. 4,181,752 (Clemens et al) and U.S. Pat. No. 4,418,120 (Kealy et al), WO 95/13331.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organosilicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

Alternatively the exposed surface of the film may be coated with a suitable release material, also referred to in the art as a low adhesive backsize (LAB). Release materials are known and include materials such as, for example, silicone, polyethylene, polycarbamate, polyacrylics, and the like. In some embodiments, the adhesive is an acrylic heat activated adhesive or acrylic pressure sensitive adhesive. Such adhesives can comprise the same general components as the (meth) acrylic polymer of the film. However, the adhesives generally comprise different concentrations of such components. For example, the adhesives often comprise a higher concentration of polymerized units of low Tg alkyl monofunctional (meth)acrylate monomer and/or a sufficient concentration of tackifier to lower the Tg and the tensile elastic modulus. In one embodiment, the acrylic adhesive comprises at least 65, 70, 75, 80, 85 or 90 wt.-% of polymerized units of low Tg alkyl monofunctional (meth)acrylate monomer, as previously described. In some embodiments, the acrylic adhesive comprises at least 0.1, 0.5, 1, 2, 3, 4, 5, 6, 7, 8, 9, or 10 wt.-% of a polar monomer, such as an acid functional monomer. The maximum concentration of polar monomer is the same as previously described for the film. In some embodiments, the acrylic adhesive comprises at least 0.4, 1, 1.5 or 2 wt-% up to about 10 or 15 wt-% of polymerized crosslinker units. The crosslinker may comprise a (meth)acrylate group and an olefin group as previously described. Alternatively, the acrylic adhesive may comprise a small concentration, e.g. less than 1 wt.-% of a triazine crosslinker. In some embodiments, the acrylic adhesive comprises greater than 5, 10, or 15 wt-% of tackifier and typically no greater than 20, 30, 40, or 50 wt.-%. In typical embodiments, the adhesive does not comprise a polyvinyl acetal (e.g. butyral) resin.

In some embodiments, the film is a graphic film used to apply designs, e.g. images, graphics, text and/or information (such as a code), on windows, buildings, pavements or vehicles such as autos, vans, buses, trucks, streetcars and the like for e.g. advertising or decorative purposes. Such designs, images, text, etc. will collectively be referred to herein as a "graphic". Many of the surfaces, e.g. vehicles, are irregular and/or uneven. In one embodiment, the graphic film is a decorative tape.

The method of making a graphic film typically comprises providing a film, as described herein, comprising a first film layer comprising a (meth)acrylic polymer and polyvinyl acetal polymer as previously described; and providing a graphic on the film.

Various methods may be used to provide a graphic on the film. Typical techniques include for example ink jet printing, thermal mass transfer, flexography, dye sublimation, screen printing, electrostatic printing, offset printing, gravure printing or other printing processes.

The graphic may be a single color or may be multi-colored. In the case of security markings, the graphic may be unapparent when viewed with wavelengths of the visible light spectrum. The graphic can be a continuous or discontinuous layer.

The graphic article comprises a graphic proximate a major surface of the first film layer1. The first film layer can be a monolithic film or a film layer comprising a (meth)acrylic polymer and polyvinyl acetal polymer, as previously described. In another embodiment, the graphic may be disposed upon an (e.g. clear) ink-receptive (e.g. coating) layer. In this embodiment, the ink-receptive (e.g. coating) layer is disposed on and typically in contact with the first film layer. Each of the embodiments may optionally further comprise an ink-receptive layer between the graphic and first film layer. The graphic is typically permanently bonded to the first film layer or ink receptive layer.

The ink-receptive layer may be characterized as a primer for the ink. In some embodiments, the ink receptive layer can be characterized as a clear or colorless ink.

Various other ink-receptive (e.g. coating) layers are known including those described in U.S. Pat. Nos. 7,025,453; 6,881,458; and 6,846,075; incorporated herein by reference. Transparent ink can be utilized as an ink-receptive layer.

In some embodiments, the first film layer can be characterized as a backing. The opposing major surface of the first film layer is typically bonded to a target surface by means of a (e.g. pressure sensitive) adhesive. The pressure sensitive adhesive is typically covered by a removable release liner as previously described.

In another embodiment, the first film layer can be characterized as a cover film. A (e.g. reverse imaged) graphic is viewed through the cover film.

The graphic article can further comprise additional second layers, as previously described.

In one embodiment, the graphic article comprises a first film layer (e.g. cover film), graphic proximate a major surface of a first film layer, and a backing disposed on the opposing surface of graphic.

In another embodiment, the graphic article comprises a first film layer (e.g. cover film), graphic proximate a major surface of a first film layer, a (e.g. pressure sensitive) adhesive bonding the (e.g. reversed-imaged) film to backing.

In another embodiment, the graphic article comprises a first film layer, graphic proximate a major surface of a first film layer, and a topcoat or cover film disposed on the opposing surface of graphic.

In another embodiment, the graphic article comprises a first (e.g. opaque) film layer, a graphic proximate a major surface of a first film layer, a (e.g. pressure sensitive) adhesive bonding a (e.g. sufficiently transparent) first film layer (e.g. cover film) to the opposing surface of graphic.

In another embodiment, the graphic article comprises a (e.g. sufficiently transparent) first film layer (e.g. cover film), a (e.g. reverse-imaged) graphic proximate a major surface of the first film layer, a (e.g. pressure sensitive) adhesive bonding the (e.g. reversed-imaged) film to first film layer (e.g. backing).

In embodiments, the first film layers (e.g. backing) and, and (e.g. sufficiently transparent) cover films comprise a (meth)acrylic polymer and polyvinyl acetal polymer.

The backing may be any of the flexible and inflexible substrates, as previously described. In some embodiments, the backing is a conformable film layer, as previously described. Further, the topcoat or cover film may also be any of the sufficiently transparent (e.g. low surface energy) hardcoats, conformable films, etc. as previously described. In one embodiment, the topcoat comprise a transparent ink applied over a (e.g. colored) graphic.

In each of the embodiments, the graphic is disposed upon the film comprising a (meth)acrylic polymer and polyvinyl acetal polymer, as previously described; or the graphic is disposed on an ink receptive layer, wherein the ink receptive layer is disposed on the film comprising a (meth)acrylic polymer and polyvinyl acetal polymer.

However, in other embodiments, the graphic is disposed upon a second film, the second film does not comprises a (meth)acrylic polymer and polyvinyl acetal polymer, as described herein. Alternatively, the graphic is disposed on an ink receptive layer, wherein the ink receptive layer is disposed on the second film. The second film is then bonded to a film comprising a (meth)acrylic polymer and polyvinyl acetal polymer. For example, in one embodiment, the graphic article comprises a (e.g. sufficiently transparent) cover film, a (e.g. reverse-imaged) graphic proximate a major surface of the cover film, a (e.g. pressure sensitive) adhesive bonding the (e.g. reverse-imaged) cover film to first film layer (e.g. backing). In this embodiment, the first film layer comprises a (meth)acrylic polymer and polyvinyl acetal polymer, as described herein and the cover film comprises a different polymeric material, such as a different conformable film.

In another embodiment, the graphic film is the same except that the order of graphic and adhesive are switched with each other. The graphic film comprises a second (e.g. backing) film comprising a graphic bonded with an adhesive to a first film layer (e.g. cover film) comprising a (meth) acrylic polymer and polyvinyl acetal polymer.

Various other arrangements can be made wherein the graphic film comprises a (meth)acrylic polymer and polyvinyl acetal polymer film as described herein in combination with a graphic.

The graphic typically comprises a dried and or cured ink layer. The dried ink layer can be derived from a wide variety of ink compositions including for example an organic solvent-based ink or water-based ink. The dried and cured ink layer can also be derived from a wide variety of radiation (e.g. ultraviolet) curable inks.

Colored inks typically comprise a colorant, such as a pigment and/or dye dispersed in a liquid carrier. The liquid carrier may comprise water, an organic monomer, a polymerizable reactive diluent in the case of radiation curable inks, or a combination thereof. For example, latex inks typically comprise water and (e.g. non-polymerizable) organic cosolvent.

A wide variety of organic and inorganic pigments are known in the art for use in inks. Suitable pigments include, but are not limited to, azo pigments such as condensed and chelate azo pigments; polycyclic pigments such as phthalocyanines, anthraquinones, quinacridones, thioindigoids, isoindolinones, and quinophthalones; nitro pigments; daylight fluorescent pigments; carbonates; chromates; titanium oxides; zinc oxides; iron oxides and carbon black. In one embodiment, the pigment is other than a white pigment, such as titanium dioxide. Pigments employed in the ink composition can include carbon black and pigments capable of generating a cyan, magenta and yellow ink. Suitable commercially available pigments include, for example, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3.

In some embodiments, such as ink jet printing inks, the pigment dispersion particles are sufficiently small to permit free flow of the ink through the ink jet printing device, and particularly the ink jet print nozzles, which typically have diameters in the range of from about 10 to about 50 microns, and more typically no greater than about 30 microns. In some embodiments, the pigment dispersion particles have diameter ranging from 50 nm to about 200 nm, and more typically no greater than 120 nm. Screen printing inks as well as materials utilized in other printing techniques as previously described, may utilize larger pigment particles. However, smaller sized pigment particles typically can also provide maximum color strength.

Ink compositions, especially those that are durable for outdoor use, also typically comprise a polymeric binder. Binders are typically compatible with pigment particles such that upon evaporation of volatile components of the ink, the binders form films of the deposited pigments on the first film layer. Suitable binders include vinyl-containing polymers, acrylic-containing polymers, urethane-containing polymers, mixtures thereof, as well as binders that contain more than one type of such moieties, such as both urethane and (meth)acrylate moieties. In the case of radiation curable inks, the binder may be formed from the reactive diluent during curing of the ink.

The organic solvent of the ink may be a single solvent or a blend of solvents. Suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; ethers such as tetraethylene glycol dimethyl ether and dialkylene glycol dialkyl ether including diethylene glycol diethyl ether; aromatic hydrocarbons such as toluene; isophorone; butyrolactone; N-methylpyrrolidone; tetrahydrofuran; esters such as lactates, acetates, including ethyl 3-ethoxypropionate and propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

In some embodiments, the ink layer is an ink jet printed layer. Ink jet printing is a method of printing by spraying droplets of ink through computer-controlled nozzles. Ink jet printing ink typically has a viscosity ranging from about 3 to about 30 centipoise at the printhead operating temperature. Such inks preferably have a viscosity below about 25 or 20 centipoise at the desired ink jetting temperature (typically from ambient temperature up to about 65° C.). Ink jet compositions characteristically have moderate to low surface tension properties. Preferred formulations have a surface tension in the range of from about 20 mN/m to about 50 mN/m and more preferably in the range of from about 22 mN/m to about 40 mN/m at the printhead operating temperature. Further, ink jet inks typically have Newtonian or substantially Newtonian viscosity properties.

Inkjet printing principally relies on the use of four colors: cyan, magenta, yellow, and black (CMYK). However, to improve resolution of images, some printers identified above also add two additional colors that are less concentrated relatives of the cyan and magenta inks, called "light cyan" and "light magenta."

In one embodiment, the ink jet ink is a solvent-based ink comprising 1 to 5 part by weight colorant (e.g. pigment), 1 to 10 parts of oligomeric or polymeric binder, and up to 115 parts of various organic solvents as previously described including for example diethylene glycol diethyl ether, γ-butyrolactone, tetraethylene glycol dimethyl ether, and dialkylene glycol dialkyl ether. In one embodiment, the ink jet ink comprises (e.g. 40-50 wt.-%) diethylene glycol diethyl ether, (e.g. less than 20 wt.-%) γ-butyrolactone, (e.g. 10-20 wt.-%) tetraethylene glycol dimethyl ether, and (15-25 wt.-%) dialkylene glycol dialkyl ether.

In another embodiments, the ink jet ink may be a water-based ink or in other words an aqueous ink jet ink. The liquid medium typically comprises at least 50%, 60%, 70%, or 80% by weight distilled and/or deionized water and may comprise water in combination with one or more water-miscible organic solvents.

In one embodiment, the liquid medium of the aqueous ink jet ink comprises (e.g. 60-90%) water, no greater than 15% of an organic solvent, such as 2-pyrrolidone, and no greater than 5% of colorant, such as carbon black.

In other embodiments, the aqueous ink jet ink further comprises a polymeric binder, such as a latex binder, typically formed by emulsion polymerization. In one embodiment, the latex binder is formed by emulsion polymerization of a first monomer, having a higher glass transition temperature Tg, and a second monomer having a lower glass transition temperature Tg. The glass transition temperature of a monomer refers more specifically to the glass transition temperature of a homopolymer formed from the particular monomer. In one embodiment, the latex binder is formed from first monomer having a glass transition temperature Tg greater than about 70° C. The first monomer may comprise styrene, substituted styrene, methyl methacrylate or a mixture thereof. Substituted styrenes include alkyl-substituted styrenes, halogen-substituted styrenes and the like. In a preferred embodiment, the first monomer, or mixture thereof, has an average glass transition temperature Tg of about 100 C, or greater. The second monomer of the latex binder typically has a glass transition temperature Tg less than about 0° C. The second monomer may comprise an alkyl acrylate such as ethyl acrylate, propyl acrylate, butyl acrylate, octyl acrylate, ethylhexyl acrylate and the like. In some embodiments, the second monomer has a glass transition temperature Tg less than about −25° C. or −50° C. The ratio of the first and second monomers may be varied so that the latex binder has a glass transition temperature Tg in the range of from about 0° C. to 70° C.

The reaction medium for preparing the latex binder may employ a charge stabilizing agent and/or an emulsifier in order to obtain the desired particle size. The latex binder typically has an average particle size from 20 nm to 500 nm, and in some embodiments from 100 nm to 300 nm. The latex binder may have a weight average molecular weight ranging from 10,000 to 5,000,000 g/mole. Various charge stabilizing agents are known such as methacrylic acid, acrylic acid, and/or a (e.g. sodium) salt thereof. Various emulsion polymerization emulsifiers are also known such as a fatty (e.g. lauryl) acid ether sulfate.

The latex ink composition also typically comprise a dispersants and/or a humectant (also referred to as a cosolvent). Non-polymeric dispersants include naphthalene sulfonic acid, sodium lignosulfate, glycerol stearate, as well as phosphate containing surfactants. Numerous polymeric dispersants are known. Such polymers typically comprise both hydrophilic moieties for aqueous compatibility and hydrophobic moieties for interaction with the pigment are preferred.

In one embodiment, the aqueous ink jet ink composition may comprise pigment, co-solvent, dispersant and latex binder. The aqueous composition may comprise 1% to 10%, 15% or 20% pigment; at least 5% or 10% ranging up to 30%, 40% or to 50% co-solvent, 0.01% to 5 or 10% dispersant, and at least 1% or 2% ranging up to 5, 10, 15 or 20% latex binder.

Various aqueous latex (e.g. ink jet) ink are known, such as described in U.S. Pat. Nos. 9,175,181 and 6,498,202.

"Radiation curable" ink comprises components having functionality directly or indirectly pendant from the backbone that reacts (e.g. crosslinks) upon exposure to a suitable source of curing energy. Suitable radiation crosslinkable groups include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are typically preferred. Of these, (meth)acryl moieties are most preferred. The term "(meth)acryl", as used herein, encompasses acryl and/or methacryl.

The energy source used for achieving crosslinking of the radiation curable functionality may be actinic (e.g., radiation having a wavelength in the ultraviolet (UV) or visible region of the spectrum), accelerated particles (e.g., electron beam (EB) radiation), thermal (e.g., heat or infrared radiation), or the like with UV and EB being preferred. Suitable sources of actinic radiation include mercury lamps, xenon lamps, carbon arc lamps, tungsten filament lamps, lasers, electron beam energy, light emitting diodes, sunlight, and the like.

The radiation curable material may be mono-, di-, tri-, tetra- or otherwise multifunctional in terms of radiation curable moieties. The radiation curable material may be straight-chained, branched, and/or cyclic with branched materials tending to have lower viscosity than straight-chain counterparts of comparable molecular weight.

When the radiation curable material is a monomer it may be referred to as a reactive diluent. Various reactive diluents are suitable including acrylate monomers such as hexanedioldiacrylate, tetrahydrofurfuryl acrylate, isobornyl acrylate, ethoxyethoxyethyl acrylate, propoxylated neopentyl-glycol diacrylate, and trimethylolpropane triacrylate as well as vinyl monomers such as vinyl caprolactam.

In some embodiments, the radiation curable ink comprises at least 25, 30, 35, 40 wt.-% ranging up to 90 wt.-% or greater of weight percent of such reactive diluent monomers.

The radiation curable ink may optionally further comprise at least 5, 10, 15 or 30 wt.-% ranging up to 50 wt. % of organic solvent.

In one embodiment, the radiation curable ink comprises (e.g. 30-45 wt.-%) organic solvent such as (tetrahydrofurfuryl) alcohol and a mixture of acrylate and vinyl monomers. For example, the monomers may contain (e.g. 10 to 20 wt.-%) of vinyl caprolactam, (e.g. 10 to 20 wt.-%) isobornyl acrylate, (e.g. 1 to 5 wt.-%) propoxylated neopentyl glycol diacrylate, and (e.g. 1 to 5 wt.-%) cyclic trimethylpropane formal acrylate.

In other embodiments, the radiation curable ink composition further comprises one or more polymeric binders. The polymeric binder may be an oligomer or macromonomer having a number average molecular weight (Mn) of at least 3,000; 4,000; 5,000, or 6,000 g/mole ranging up to 10,000 or 15,000 g/mole. Alternatively, the polymeric binder may have a higher molecular weight.

In some embodiments, the polymeric binder comprises methylmethacrylate, isobutyl methacrylate or isobutylmethacrylate/isooctylacrylate repeating unit. The polymeric binder may have a methyl/methacrylate repeating unit and a methacrylic acid end group. The polymeric binder may be present in an amount of at least 10, 15, 20, or 25 wt.-% ranging up to 35, 40, 45, 50, 55, or 60 wt.-%. of the ink.

The water-based, solvent-based, and radiation curable ink may comprise a variety of optional additives. Such optional additives include one or more flow control agents, slip modifiers, thixotropic agents, surfactants (e.g. fluorochemical), foaming agents, antifoaming agents (e.g. silica and silicone oil), flow or other rheology control agents, waxes, oils, antioxidants, photoinitiators and photoinitiator stabilizers in the case of radiation curable inks, dispersants, gloss agents, fungicides, bactericides, organic and/or inorganic filler particles, leveling agents, opacifiers, antistatic agents, dispersants, and the like. To enhance durability of the design, image, etc., especially in outdoor environments exposed to sunlight, a variety of commercially available stabilizing chemicals can be added such as heat stabilizers, UV light stabilizers, and free-radical scavengers.

Inorganic fillers such as crystalline and amorphous silica, aluminum silicate, and calcium carbonate, etc. can be included to impart increased surface roughness, reduced gloss and improved dot gain. The concentration of inorganic fillers typically ranges from about 0.1% to about 10% by weight and preferably from about 0.5% to about 5%. The particle size is preferably less than one micron, more preferably less 0.5 microns, and most preferably less than about 0.2 microns.

Representative ink jet printing inks include for example HP Latex 360 Printer (HP 83 Inks), Roland XR-640 (Roland ESL4 Eco Inks), and EFI VUTEk GS3250LX Pro (EFI VU ILk GSLXr 3M™ SuperFlex UV Ink).

In another embodiment, the graphic comprises a screen printed ink. Screen printing is a method of printing by using a squeegee to force ink through an assembly of mesh fabric and a stencil. Screen printing inks also comprise polymeric binder dispersed in (e.g. 40 to 60 wt.-% of) liquid carrier, colorant (in the case of colored ink) as well as the previously described optional additives and inorganic fillers. However, screen printing inks can utilized higher molecular weight polymeric binders. Further, screen printing ink typically contain over 40% solids and have a viscosity of at least two orders of magnitude greater than the viscosity of ink jet printing inks.

In some embodiments, the screen printing ink may be an organic solvent-based screening printing ink that comprise an acrylic and/or vinyl polymeric binder. Suitable acrylic polymer binder include methyl methacrylate polymers and copolymers. In some embodiments, the screen printing ink may comprise 5 to 10 wt.-% of acrylic polymer binder. Suitable vinyl polymer binders include copolymer of vinyl acetate, vinyl alcohol and vinyl chloride. In some embodiments, the screen printing ink may comprise 10 to 20 wt.-% of vinyl polymer binder.

The screen printing ink may further comprise up to 15 wt-% of plasticizer(s) including polymeric plasticizer and phthalates (e.g. diundecyl phthalate), colorant (e.g. pigment), as well as 1 to 5 wt.-% of inorganic fillers as previously described. The organic solvent-based screen printing ink comprises 40 to 60 wt-% of organic solvent(s) as previously described. In one embodiment, the screen printing ink comprises (e.g. 35 to 45 wt.-%) cyclohexanone, (e.g. 10 to 20 wt.-%) of ethyl 3-ethoxy propionate, and (e.g. 5 to 10 wt.-%) 2-butoxyethyl acetate.

In other embodiments, the screen printing ink is a radiation curable ink comprising at least one polymer dispersed in reactive diluent(s) as the liquid carrier, colorant (in the case of colored ink) as well as the previously described optional additives and inorganic fillers. In one embodiment, the radiation curable screen printing ink comprises 10 to 20 wt.-% methylmethacrylate polymer, colorant (e.g. pigment), up to 5 wt.-% of inorganic fillers as previously described, and up to 90 wt. % of a mixture of reactive diluents. In one embodiment, the radiation curable screen printing ink comprises (e.g. 30 to 40 wt.-%) aromatic (meth)acrylate monomer, such as phenoxy ethyl acrylate, (e.g. 5 to 15 wt.-%) aliphatic urethane acrylate, (e.g. 10 to 20 wt.-%) of vinylcaprolactam, (e.g. 1 to 5 wt. %) of 1-propanone, 2-(dimethylamino)-1-[4-(4-morpholinyl)phenyl]-2-(phenylmethyl), (e.g. 1 to 5 wt. %) of 1-butanone, 2-(dimethylamino)-1-[4-(4-morpholinyl)phenyl]-2-(phenylmethyl), (e.g. 1 to 5 wt.-%) diethylene glycol ethyl ether acrylate, and (e.g. 1 to 5 wt.-%) propoxylated glycerol triacrylate.

Suitable examples of screen printing ink include 3M™ Screen Printing UV Ink 9802 Opaque Black, 3M™ Scotchlite™ Transparent Screen Printing Ink 2905 Black, as well as those described in U.S. Pat. No. 6,232,359.

Objects and advantages of this invention are further illustrated by the following examples. The particular materials and amounts, as well as other conditions and details, recited in these examples should not be used to unduly limit this invention.

Examples

White and opaque films made from cured acrylic monomers were printed with various methods and inks. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

Table of Abbreviations

| Abbreviation | Description |
| --- | --- |
| PVB1 | Poly(vinyl butyral), available as, MOWITAL B60H from Kuraray, Houston, TX. |
| PVB2 | Poly(vinyl butyral), available as, MOWITAL B60HH from Kuraray, Houston, TX. |
| PVB3 | Poly(vinyl butyral), available as, MOWITAL B45H from Kuraray, Houston, TX. |
| M1 | 2-Ethylhexyl acrylate, available from BASF, Florham Park, NJ. Tg = −50° C. |
| M2 | Ethoxyethoxy ethyl acrylate, available as, SR256 from Sartomer, Exton, PA. Tg = −54° C. |
| M3 | 2-octyl acrylate, prepared according to Preparatory Example 1 of U.S. Pat. No. 7,385,020 Tg = −45° C. |
| M5 | Isobornyl acrylate, available from San Esters, New York, NY. Tg = 94° C. |
| M6 | Acrylic acid, available from BASF, Florham Park, NJ. Tg = 106° C. |
| M7 | Tetrahydrofurfuryl acrylate, available from TCI America Portland OR. Tg = −12° C. |
| M8 | 2-Hydroxyl ethyl acrylate, available from BASF Tg = 4° C. |
| M9 | Hydroxypropyl Acrylate, available from BASF, Florham Park, NJ. Tg = −7° C. |
| XL1 | Aliphatic polyester based urethane diacrylate oligomer, available as CN965 from Sartomer Americas, Exton, PA, |
| I1 | Bis(2,4,6-trimethylbenzoyl)-phenylphosphineoxide, available as IRGACURE 819 from BASF Corporation, Vandalia, IL. |
| I2 | 2,2-Dimethoxy-1,2-diphenylethan-l-one, available as IRGACURE 651 from BASF Corporation, Vandalia, IL. |
| A1 | Titanium dioxide, available as 2160 from Kronos Worldwide, Inc. Dallas, TX. |
| A3 | Active polymeric dispersant, available as SOLSPERSE 32000 from Lubrizol Corp. Wickliffe, OH. |
| A2 | Triethyleneglycol di-(2-ethyl hexanoate), available from Eastman Chemical Company, Kingsport, TN. |
| M10 | Isooctyl acrylate, available as 3M Monomer - IOA DS-2051 from 3M Company, St. Paul, MN. Tg = −70° C. |
| PET | PET film having a nominal thickness of 50 micrometers (0.002 inches) available as LUMIRROR F65C from Toray Plastics, North Kingstown, RI. |
| Film1 | Graphic Film with COMPLY Adhesive available as 3M CONTROLTAC IJ180Cv3-10 White, from 3M Company St. Paul, MN. |

EXAMPLES

Film Preparation:

Formulations were mixed according to the percentage given in Table 1. Formulations were mixed in Flack Tek (Landrum S.C.) DAK 150 SPEEDMIXER up at 3000 rpm until a homogenous solution was obtained. The formulations were coated between two 50 micrometer (0.002 inch) thick PET liners at a thickness of approximately 50 micrometers (0.002 inch) using a two roll coater. The coated composition was exposed to a total UVA energy of approximately 2700 miliJoules/cm² using a plurality of fluorescent bulbs having a peak emission wavelength of 350 nanometers. The total UVA energy was determined using a POWERMAP radiometer equipped with low power sensing head (available from EIT Incorporated, Sterling, Va.). This resulted in Cured Film samples. The films were white except for Example 7 that was clear. Table 1A and 1B Film Formulations (all amounts are in parts by weight)

TABLE 1A

| Ex. | PVB1 | M1 | M2 | M5 | M6 | M8 | M9 | XL1 | I1 | A1 | M10 | A3 |
|---|---|---|---|---|---|---|---|---|---|---|---|---|
| 1 | 5.0 | 25.8 | | 22.1 | 8.6 | 8.6 | | 6.5 | 1.0 | 18.2 | 3.6 | 0.5 |
| 2 | 10.0 | 23.9 | | 20.8 | 8.0 | 8.0 | | 6.0 | 1.0 | 18.2 | 3.6 | 0.5 |
| 3 | 15.0 | 22.0 | | 19.4 | 7.3 | 7.3 | | 5.5 | 1.0 | 18.2 | 3.6 | 0.5 |
| 4 | 20.0 | 20.1 | | 18.1 | 6.7 | 6.7 | | 5.0 | 1.0 | 18.2 | 3.6 | 0.5 |
| 5 | 15.0* | 22.0 | | 19.4 | 7.3 | 7.3 | | 5.5 | 1.0 | 18.2 | 3.6 | 0.5 |
| 6 | 15.0** | 22.0 | | 19.4 | 7.3 | 7.3 | | 5.5 | 1.0 | 18.2 | 3.6 | 0.5 |
| 7 | 20.0 | 30.0 | | 21.5 | 10.0 | 10.0 | | 7.5 | 1.0 | | | |
| 8 | 15.0 | | 22.0 | 19.4 | 7.3 | 7.3 | | 5.5 | 1.0 | 18.2 | 3.6 | 0.5 |
| 9 | 15.0 | 22.0 | | 19.4 | 7.3 | | 7.3 | 5.5 | 1.0 | 18.2 | 3.6 | 0.5 |
| 10 | 15.0 | 12.0 | | 29.4 | 7.3 | 7.3 | | 5.5 | 1.0 | 18.2 | 3.6 | 0.5 |

*PVB 2 instead of PVB 1
**PVB 3 instead of PVB 1

TABLE 1B

| Ex. | PVB1 | M1 | M5 | M6 | M7 | M8 | XL1 | XL2 | XL3 | I1 | A1 | M10 | A3 |
|---|---|---|---|---|---|---|---|---|---|---|---|---|---|
| 11 | 15.0 | 32.3 | 9.1 | 7.3 | | 7.3 | 5.5 | | | 1.0 | 18.2 | 3.6 | 0.5 |
| 12 | 15.0 | 22.0* | 19.4 | 7.3 | | 7.3 | 5.5 | | | 1.0 | 18.2 | 3.6 | 0.5 |
| 13 | 15.0 | 0.0 | 19.4 | 7.3 | 22.0 | 7.3 | 5.5 | | | 1.0 | 18.2 | 3.6 | 0.5 |
| 14 | 15.0 | 22.0 | 12.1 | 14.6 | | 7.3 | 5.5 | | | 1.0 | 18.2 | 3.6 | 0.5 |
| 15** | 15.0 | 20.1 | 18.1 | 6.7 | | 6.7 | 5.0 | | | 1.0 | 18.2 | 3.6 | 0.5 |
| 16 | 16.1 | 24.2 | 20.0 | | 8.1 | 8.1 | 6.0 | | | 0.8 | 13.5 | 2.7 | 0.4 |

*M3 instead of M1
**additional 5.0 wt.-% of A2

Example Preparation:

Cured Film samples (4 inch by 12 inch) were hand applied to a carrier web (Film1) using a 25 micron thick acrylic PSA to keep the sample on the web as it was printed. The exposed film side of the Cured Film laminate was printed with a variety of different printers and ink types as shown in Table 2 and 3. The Control Example is Film1. Three types of ink jet printers were used: HP Latex 360 Printer with HP 83 Inks available from Hewlett-Packard Development Company, L.P. Houston, Tex., SOLJET Pro 4 XR-640 with Roland ESL4 Eco Inks available from Roland DGA Corp. Irvine, Calif., EFI VUTEk GS3250LX Pro with EFI VU ILk GSLXr 3M SUPERFLEX UV Ink available from Electronics For Imaging, Inc. Fremont, Calif. CMYK color bars at 100% were printed for each Example covering at least 15 cm². Examples were also screen printed using a CAMEO screen printing press made by American M&M Screen Printing Equipment Company (Chicago, Ill.) using a 230 mesh screen and two types of inks: 3M Screenprinting Opaque UV Ink 9802 Black and 3M SCOTCHLITE Transparent Screen Printing Ink 2905 Black, Opaque, both available form 3M Company St. Paul, Minn. The solvent based ink samples were dried at room temperature for 24 hours. The UV cured ink samples were processed immediately thru the UV processor at a dose of 225 miliJoules. Printability results were obtained using the test method listed below for each Example and are shown in Table 2 and 3.

Test Method

Printability

Printability was evaluated using an absolute print density test method according to ASTM D7305-08a: "Standard Test Method for Reflection Density of Printed Matter." Ink density was measured using a Model 504 SpectroDensitometer available from X-Rite Inc. Grand Rapids, Mich. Measured color density is shown in Tables 2 and 3. The Control Example, Film1, is a commercially available vinyl graphic arts film and represents typical print quality. The ink color density of the Example film is compared to the ink color density of the Control Example by dividing the print density of the Example by the print density of the Control Example and expressing the result as a percentage of standard performance. Achievements of 100% indicate equal color saturation. Values higher than 100% represent higher color saturation and values below 100% represent less saturation. Total color density is the summation of the measurements for cyan, magenta, yellow, and black.

TABLE 2A

Measured color density for inkjet printers

HP Latex 360-83 Inks Color Density

| Ex. | Cyan | Magenta | Yellow | Black | Total | % Control |
|---|---|---|---|---|---|---|
| 1 | 1.46 | 1.32 | 0.91 | 1.55 | 5.24 | 83% |
| 2 | 1.46 | 1.35 | 0.9 | 1.55 | 5.26 | 84% |
| 3 | 1.44 | 1.32 | 0.91 | 1.54 | 5.21 | 83% |
| 4 | 1.47 | 1.34 | 0.89 | 1.55 | 5.25 | 83% |
| 5 | 1.48 | 1.35 | 0.9 | 1.56 | 5.29 | 84% |
| 6 | 1.47 | 1.31 | 0.91 | 1.59 | 5.28 | 84% |
| 7 | 1.51 | 1.35 | 0.92 | 1.56 | 5.34 | 85% |
| 8 | 1.41 | 1.28 | 0.88 | 1.41 | 4.98 | 79% |
| 9 | 1.51 | 1.35 | 0.92 | 1.57 | 5.35 | 85% |
| 10 | 1.55 | 1.35 | 0.91 | 1.67 | 5.48 | 87% |

TABLE 2A-continued

Measured color density for inkjet printers

HP Latex 360-83 Inks Color Density

| Ex. | Cyan | Magenta | Yellow | Black | Total | % Control |
|---|---|---|---|---|---|---|
| 11 | 1.34 | 1.27 | 0.88 | 1.46 | 4.95 | 79% |
| 12 | 1.48 | 1.34 | 0.89 | 1.54 | 5.25 | 83% |
| 13 | 1.47 | 1.36 | 0.89 | 1.55 | 5.27 | 84% |
| 14 | 1.35 | 1.26 | 0.85 | 1.43 | 4.89 | 78% |
| 15 | 1.46 | 1.35 | 0.91 | 1.54 | 5.26 | 84% |
| 16 | 1.74 | 1.57 | 1.02 | 1.9 | 6.23 | 99% |
| Control | 1.74 | 1.56 | 1.02 | 1.98 | 6.29 | |

TABLE 2B

Measured color density for inkjet printers

Roland XR-640/ESL4 Eco Inks Color Density

| Ex. | Cyan | Magenta | Yellow | Black | Total | % Control |
|---|---|---|---|---|---|---|
| 1 | 1.81 | 1.18 | 0.9 | 1.73 | 5.62 | 83% |
| 2 | 1.8 | 1.19 | 0.9 | 1.74 | 5.63 | 84% |
| 3 | 1.96 | 1.25 | 0.91 | 1.88 | 6.00 | 89% |
| 4 | 1.79 | 1.25 | 0.87 | 1.86 | 5.77 | 86% |
| 5 | 1.8 | 1.26 | 0.91 | 1.76 | 5.73 | 85% |
| 6 | 1.72 | 1.21 | 0.9 | 1.76 | 5.59 | 83% |
| 7 | 2.1 | 1.33 | 0.97 | 2.13 | 6.53 | 97% |
| 8 | 1.85 | 1.18 | 0.89 | 1.41 | 5.33 | 79% |
| 9 | 1.84 | 1.26 | 0.9 | 1.83 | 5.83 | 86% |
| 10 | 2.03 | 1.23 | 0.93 | 1.75 | 5.94 | 88% |
| 11 | 1.35 | 1.02 | 0.79 | 1.25 | 4.41 | 65% |
| 12 | 2 | 1.19 | 0.92 | 1.64 | 5.75 | 85% |
| 13 | 2.02 | 1.29 | 0.92 | 1.92 | 6.15 | 91% |
| 14 | 2.04 | 1.22 | 0.92 | 1.86 | 6.04 | 90% |
| 15 | 1.83 | 1.16 | 0.89 | 1.61 | 5.49 | 81% |
| 16 | 2.01 | 1.3 | 0.92 | 2.01 | 6.24 | 93% |
| Control | 2.27 | 1.38 | 0.96 | 2.13 | 6.74 | |

TABLE 2C

Measured color density for inkjet printers

VUTEk UV/GSLXr 3M ™ SUPERFLEX Color Density

| Example | Cyan | Magenta | Yellow | Black | Total | % Control |
|---|---|---|---|---|---|---|
| 1 | 1.73 | 1.46 | 0.91 | 1.8 | 5.9 | 103% |
| 2 | 1.6 | 1.45 | 0.89 | 1.74 | 5.68 | 99% |
| 3 | 1.72 | 1.51 | 0.91 | 1.8 | 5.94 | 103% |
| 4 | 1.62 | 1.53 | 0.92 | 1.82 | 5.89 | 103% |
| 5 | 1.62 | 1.53 | 0.91 | 1.78 | 5.84 | 102% |
| 6 | 1.52 | 1.43 | 0.87 | 1.6 | 5.42 | 94% |
| 7 | 1.73 | 1.47 | 0.89 | 1.8 | 5.89 | 103% |
| 8 | 1.73 | 1.53 | 0.92 | 1.76 | 5.94 | 103% |
| 9 | 1.7 | 1.51 | 0.92 | 1.7 | 5.83 | 102% |
| 10 | 1.76 | 1.52 | 0.93 | 1.82 | 6.03 | 105% |
| 11 | 1.45 | 1.35 | 0.87 | 1.56 | 5.23 | 91% |
| 12 | 1.62 | 1.5 | 0.9 | 1.77 | 5.79 | 101% |
| 13 | 1.82 | 1.5 | 0.92 | 1.78 | 6.02 | 105% |
| 14 | 1.89 | 1.53 | 0.93 | 1.8 | 6.15 | 107% |
| 15 | 1.74 | 1.52 | 0.92 | 1.8 | 5.98 | 104% |
| 16 | 1.47 | 1.36 | 0.87 | 1.58 | 5.28 | 92% |
| Control | 1.66 | 1.45 | 0.90 | 1.74 | 5.74 | |

TABLE 3

Measured color density for screenprint inks

| | 9802UV Screen Print | | 2905 Solvent Screenprint | |
|---|---|---|---|---|
| Example | Black | % Control | Black | % Control |
| 1 | 2.07 | 98% | 2.29 | 98% |
| 2 | 2.08 | 98% | 2.32 | 99% |
| 3 | 2.06 | 97% | 2.34 | 100% |
| 4 | 2.03 | 96% | 2.31 | 99% |
| 5 | 2.06 | 97% | 2.32 | 99% |
| 6 | 2.08 | 98% | 2.27 | 97% |
| 7 | 2.09 | 99% | 2.31 | 99% |
| 8 | 1.63 | 77% | 2.32 | 99% |
| 9 | 2.07 | 98% | 2.30 | 98% |
| 10 | 2.08 | 98% | 2.33 | 100% |
| 11 | 2.04 | 96% | 2.15 | 92% |
| 12 | 2.06 | 97% | 2.33 | 100% |
| 13 | 2.08 | 98% | 2.39 | 102% |
| 14 | 2.08 | 98% | 2.37 | 101% |
| 15 | 2.07 | 98% | 2.35 | 101% |
| 16 | 1.99 | 94% | 2.25 | 96% |
| Control | 2.12 | | 2.34 | |

Cover Print and Film Examples

The clear film from Example 7 could be laminated to an adhesive such as a pressure-sensitive adhesive comprising isooctyl acrylate/acrylic acid copolymer (monomers available from Sigma Aldrich; copolymer prepared using methods described in U.S. Pat. No. 4,737,577 Example 5) to become an overlamination film. This overlaminate film could be used to cover a printed film such as Example 4. The printed film form Example 4 could be over coated with ink such as 3M Screen Print UV Gloss Clear 9740i or 3M Screen Print Matte Clear 9730UV both available form 3M Company, St. Paul, Minn. using a printing process.

What is claimed is:

1. An article comprising:
   a first film layer having a Tg ranging from 30° C. to 60° C. comprising a (meth)acrylic polymer and polyvinyl acetal polymer composition comprising polymerized units having the following formula

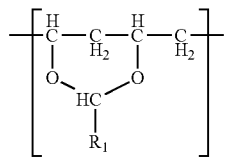

wherein $R_1$ is hydrogen or a C1-C7 alkyl group;
   wherein the article comprises a graphic proximate a major surface of the first film layer.

2. The article of claim 1 wherein the graphic is disposed on a major surface of the film layer.

3. The article of claim 2 wherein the graphic comprises a dried and/or cured ink layer.

4. The article of claim 3 wherein the ink layer comprises a colorant.

5. The article of claim 3 wherein the ink layer comprises a polymeric binder.

6. The article of claim 3 wherein the ink layer is a dried and/or cured radiation cured ink, organic solvent-based ink, or water-based ink.

7. The article of claim 6 wherein the dried and/or cured ink layer is an ink-jetted ink or a screen printed ink.

8. The article of claim 1 further comprising a topcoat disposed on the graphic.

9. The article of claim 8 wherein the topcoat comprises a transparent dried and/or cured radiation cured ink, organic solvent-based ink, or water-based ink.

10. The article of claim 1 further comprising a cover film bonded to the graphic with an adhesive layer.

11. The article of claim 8 wherein the topcoat layer or cover film comprises a (meth)acrylic polymer.

12. The article of claim 10 wherein the cover film further comprises a polyvinyl acetal polymer.

13. The article of claim 1 further comprising a second film layer, a graphic proximate the second film layer wherein the second film layer and/or graphic is bonded to the first film layer.

14. The article of claim 13 wherein the second film layer is a backing layer or a cover film layer.

15. The article of claim 1 wherein the first film layer comprises at least 25 wt.-% of polymerized units of monofunctional alkyl (meth)acrylate monomer having a Tg of less than 0° C.

16. The article of claim 1 wherein the first film layer comprises 5 to 30 wt.-% of polyvinyl acetal polymer.

17. The article of claim 1 wherein the first film layer comprises photoinitiator.

18. The article of claim 1 wherein the first film layer comprises a pigment, colorant, decorative additive, or a combination thereof.

19. The article of claim 1 wherein the (meth)acrylic polymer and polyvinyl acetal polymer composition of the first film layer has a single phase.

20. The article of claim 1 wherein the first film layer has a tensile strength ranging from 10 to 50 MPa and an elongation at break of at least 175%.

21. The article of claim 1 wherein the graphic comprises a design, image, text, and/or code.

* * * * *

UNITED STATES PATENT AND TRADEMARK OFFICE
CERTIFICATE OF CORRECTION

PATENT NO. : 10,493,738 B2
APPLICATION NO. : 15/778266
DATED : December 3, 2019
INVENTOR(S) : Amanda Hulke et al.

Page 1 of 1

It is certified that error appears in the above-identified patent and that said Letters Patent is hereby corrected as shown below:

In the Specification

Column 17,
Line 40, delete "five-" and insert -- free- --, therefor.

Column 19,
Line 3, delete "polyimide," and insert -- polyamide, --, therefor.

Column 26,
Line 63, delete "100 C," and insert -- 100° C., --, therefor.

Column 28,
Line 16, delete "trimethylpropane" and insert -- trimethylolpropane --, therefor.
Lines 58 & 59, delete "VU ILk" and insert -- VUTEk --, therefor.

Columns 29 & 30,
Line 50, delete "-Dimethoxy-l,2-" and insert -- -Dimethoxy-1,2- --, therefor.
Line 50, delete "-l-one," and insert -- -1-one, --, therefor.

Column 31,
Line 54, delete "VU ILk" and insert -- VUTEk --, therefor.

Signed and Sealed this
Fifth Day of May, 2020

Andrei Iancu
*Director of the United States Patent and Trademark Office*